(12) United States Patent
Kilaru et al.

(10) Patent No.: US 11,099,549 B2
(45) Date of Patent: Aug. 24, 2021

(54) SYSTEM, METHOD, AND COMPUTER-READABLE STORAGE MEDIUM FOR AUTOMATED MANUFACTURING DEFECT DETECTION

(71) Applicant: TOYOTA MOTOR NORTH AMERICA, INC., Plano, TX (US)

(72) Inventors: Raja Shekar Kilaru, Plano, TX (US); Joshua Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 141 days.

(21) Appl. No.: 16/283,008

(22) Filed: Feb. 22, 2019

(65) Prior Publication Data

US 2020/0272137 A1 Aug. 27, 2020

(51) Int. Cl.
| | |
|---|---|
| *G05B 23/02* | (2006.01) |
| *G07C 5/00* | (2006.01) |
| *G05B 19/418* | (2006.01) |
| *B62D 65/00* | (2006.01) |

(52) U.S. Cl.
CPC ......... *G05B 23/024* (2013.01); *B62D 65/005* (2013.01); *G05B 19/41875* (2013.01); *G07C 5/008* (2013.01)

(58) Field of Classification Search
CPC ............ G05B 23/024; G05B 19/41875; B62D 65/005; G07C 5/008
USPC ........................................................ 700/110
See application file for complete search history.

(56) References Cited

U.S. PATENT DOCUMENTS

| | | | |
|---|---|---|---|
| 5,166,874 | A | 11/1992 | Nomaru et al. |
| 5,319,962 | A | 6/1994 | Kaminski et al. |
| 7,430,813 | B2 | 10/2008 | Park |
| 7,650,202 | B2 | 1/2010 | Strohband et al. |

(Continued)

FOREIGN PATENT DOCUMENTS

JP A 2010-134642 6/2010

OTHER PUBLICATIONS

Zhang (NPL: A big data analytics architecture for cleaner manufacturing and maintenance processes of complex products) (Year: 2016).*

*Primary Examiner* — Jigneshkumar C Patel
(74) *Attorney, Agent, or Firm* — Oblon, McClelland, Maier & Neustadt, L.L.P.

(57) ABSTRACT

An automated manufacturing defect detection system includes processing circuitry configured to receive historical parts statistics corresponding to a failure of parts used in a vehicle assembly, receive vehicle sensor statistics corresponding to a failure of parts of post manufactured vehicles, and receive historical assembly line statistics corresponding to a failure of assembly of parts during the vehicle assembly. Additionally, the processing circuitry is configured to generate a profile for one or more parts used in the vehicle assembly, receive an analysis of each of the one or more parts of the assembled vehicle, determine whether any of the one or more analyzed parts deviate from the profile generated for that part, and in response to a determination that any of the one or more analyzed parts deviate from the profile generated for that part by greater than an expected quality threshold, automatically communicate an alert corresponding to the deviation.

6 Claims, 8 Drawing Sheets

(56) References Cited

U.S. PATENT DOCUMENTS

2010/0241380 A1* 9/2010 Cookson ............... G06T 7/0004
                                                          702/84
2016/0363501 A1* 12/2016 Larkins .................... G01L 1/02
2017/0102693 A1   4/2017 Kidd et al.
2017/0242426 A1   8/2017 Yasukavva et al.
2018/0181112 A1* 6/2018 Wang ................... G05B 19/058

* cited by examiner

SYSTEM, METHOD, AND COMPUTER-READABLE STORAGE MEDIUM FOR AUTOMATED MANUFACTURING DEFECT DETECTION

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Identifying manufacturing defects in vehicles is important for driver safety and decreases financial risk (e.g., recalls, lawsuits, etc.). Commonly, manufacturing defects of vehicle parts/systems may be identified using random spot-checks where newly manufactured vehicles are inspected for defects. However, random spot-checks typically involve inspecting a few vehicles sampled from a larger manufactured fleet of vehicles. By examining only a few selected vehicles, there is an increased likelihood of multiple manufacturing defects (that may be present in any vehicle not selected for inspection) going unnoticed. As a result, accuracy of the overall inspection process during manufacturing may be compromised.

SUMMARY

According to aspects of the disclosed subject matter, an automated manufacturing defect detection system includes processing circuitry configured to receive historical parts statistics corresponding to a failure of parts used in a vehicle assembly, receive vehicle sensor statistics corresponding to a failure of parts of post manufactured vehicles, and receive historical assembly line statistics corresponding to a failure of assembly of parts during the vehicle assembly. Additionally, the processing circuitry is configured to generate a profile for one or more parts used in the vehicle assembly, receive an analysis of each of the one or more parts of the assembled vehicle, determine whether any of the one or more analyzed parts deviate from the profile generated for that part, and in response to a determination that any of the one or more analyzed parts deviate from the profile generated for that part by greater than an expected quality threshold, automatically communicate an alert corresponding to the deviation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
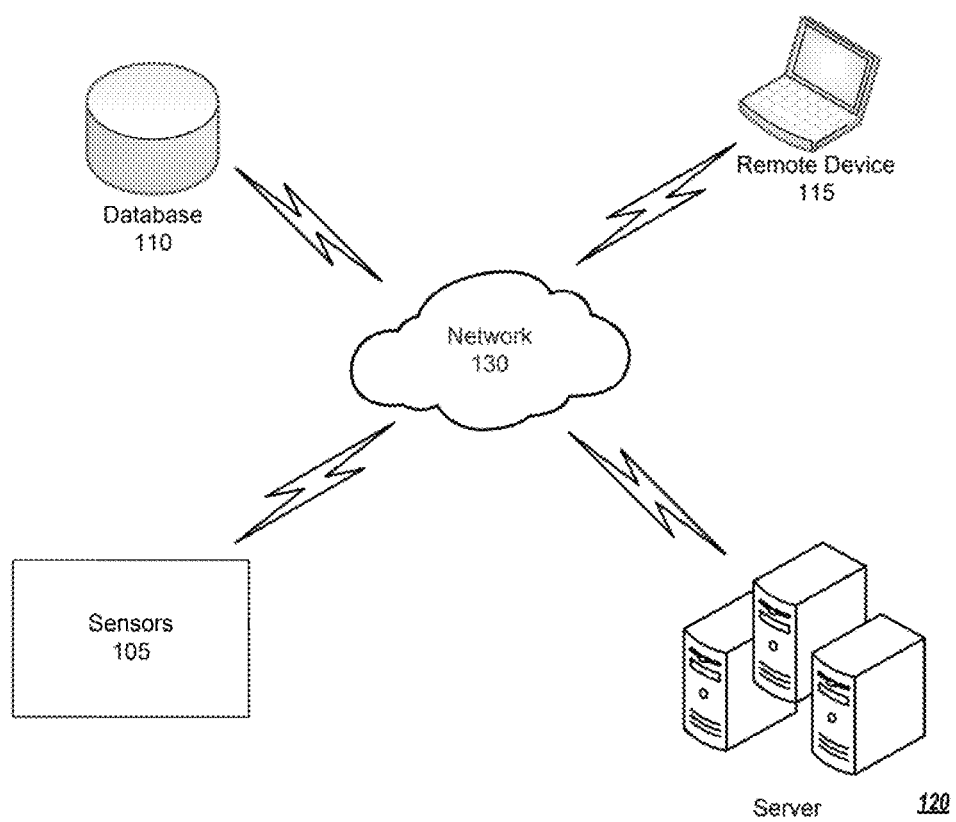
FIG. 1 illustrates an exemplary overview of an automated manufacturing defect detection system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 illustrates an exemplary overview of an automated manufacturing defect detection system (herein referred to as the system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable storage medium storing a program that, when executed, configures or causes a computer to perform or cause performance of the described method(s) or portions thereof).

The system 100 can include sensors 105, a database 110, a remote device 115, a server 120, and a network 130 communicably coupling the sensors 105, the database 110, the remote device 115, and the server 120.

Generally speaking, data analytics can be applied to expedite and automate the identification of manufacturing defects of vehicles. The automation and reduced inspection time can allow for each manufactured vehicle to be inspected (e.g., in the assembly line), without adding substantial delays to the manufacturing process. Also, the innovation can address the limitations of random spot-checks, thereby improving the accuracy of inspecting manufactured vehicles.

More specifically, the system 100 can be used to identify manufacturing defects of a vehicle, at least in part, using big data analytics. Big data relating to the manufacturing of vehicles can be gathered using big data sources (e.g., assembly line sensors, car line sensors, parts manufacturing data, etc.) and/or vehicle sensors/subsystems. In some cases, data can be gathered during manufacturing and post-manufacture throughout the life-cycle of the vehicles. Analysis of the collected data can be applied to derive one or more profiles that correspond to parts/systems of manufactured vehicles. For example, the profiles can define normal function or degradation of the respective part. Moreover, information from a vehicle being assessed (e.g., collected once a vehicle is at the end of an assembly line) can be gathered in real-time and analyzed to identify whether any of the assessed parts deviate from properties within the profiles of nominal parts/systems. The identified deviations may be indicative of a manufacturing defect and/or improper assembly, for example. Further, in response to detecting a defect and/or improper assembly, the system 100 can automatically communicate an alert when the defect and/or improper assembly are detected. Thus, each vehicle can be checked on the assembly line automatically using data rather than random spot checks. Big data analytics may also be used to refine the algorithm applied to identify deviating properties.

The sensors 105 can represent one or more sensors in the system 100 communicably coupled to the database 110, the remote device 115, and the server 120 via the network 130. For example, the sensors 105 can be configured to receive data from vehicles, assembly lines, and end of assembly line assessments. Additionally, the sensors 105 can be configured to transmit the data to one or more of the database 110, the remote device 115, and the server 120.

The database 110 can represent one or more local and/or external databases and/or memory communicably coupled to the sensors 105, the remote device 115, and the server 120 via the network 130. For example, the database 110 can store various statistical information used to assist in automatically identifying manufacturing defects of vehicles.

The remote device 115 can represent one or more remote devices communicably coupled to the sensors 105, the database 110, and the server 120 via the network 130. For example, the remote device 115 can include a computer, laptop, smartphone, tablet, PDA, smart watch, and the like. The remote device 115 can include processing circuitry configured to operate the system 100 remotely, gather data from the sensors 105, receive statistical information from the database 110, receive/transmit a defect alert, and the like.

The server 120 can represent one or more servers communicably coupled to the sensors 105, the database 110, and the remote device 115 via the network 130. For example, the server 120 can include processing circuitry configured to operate the system 100, receive data from the sensors 105, receive statistical information from the database 110, receive/transmit a defect alert, and the like.

The processing circuitry of the remote device 115 and the server 120 can carry out instructions to perform or cause performance of various functions, operations, steps or processes of the system 100. The processing circuitry can be configured to store information in memory, operate the system 100, and receive and send information in the form of signal(s) between the sensors 105, the database 110, the remote device 115, and the server 120.

The network 130 can represent one or more networks connecting the sensors 105, the database 110, the remote device 115, and the server 120. The network 130 can be a public network, such as the Internet, or a private network such as a local area network (LAN) or a wide area network (WAN) network, or any combination thereof and can also include a public switched telephone network (PSTN) or integrated services for digital network (ISDN) sub-networks. The network 130 can also be wired, such as an Ethernet network or a USB port, or can be wireless such as a cellular network including EDGE, 3G 4G, and LTE/LTE-A wireless cellular systems. The wireless network can also be Wi-Fi, Bluetooth, or any other wireless form of communication that is known.

Figure 2:
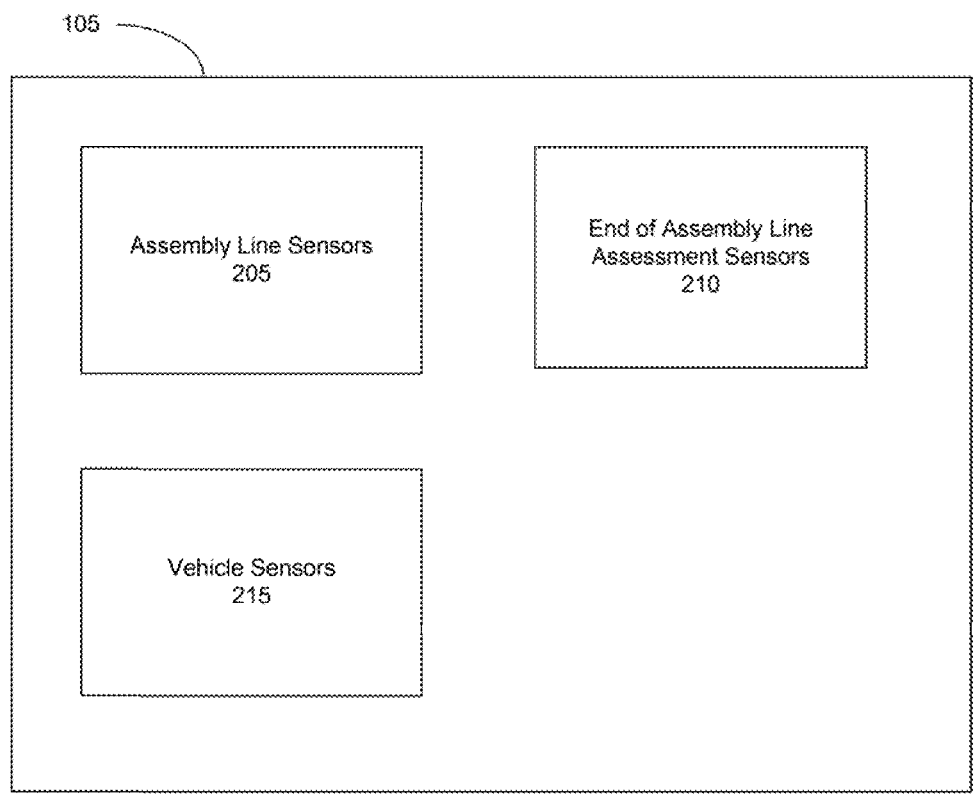
FIG. 2 illustrates a block diagram of a plurality of sensors in the automated manufacturing defect detection system according to one or more aspects of the disclosed subject matter.

FIG. 2 illustrates a block diagram of a plurality of sensors (e.g., sensors 105) in the automated manufacturing defect detection system 100 according to one or more aspects of the disclosed subject matter. The sensors 105 can include assembly line sensors 205, end of assembly line assessment sensors 210, and vehicle sensors 215.

For example, assembly line sensors 205 can include sensors used to monitor a vehicle assembly line. The assembly line sensors 205 may be configured to monitor operation of the assembly machines, monitor progress of the assembly of the vehicle, monitor the assembly of specific components, and the like. The assembly sensors 205 can gather various assembly line data and transmit the assembly line data to the server 120, for example.

The end of assembly line assessment sensors 210 can includes sensors configured to inspect the assembled vehicle at the end of the assembly line. At this stage, the end of assembly line assessment sensors 210 can perform a full evaluation of the vehicle including assessing one or more parts of the vehicle, a quality of the specific systems of the vehicle, an overall quality of the assembly of the vehicle, and the like. In other words, the end of assembly line assessment sensors 210 can gather various vehicle assessment data of the completely assembled vehicle and transmit the end of assembly line assessment data to the server 120, for example.

The vehicle sensors 215 can include sensors configured to monitor various parts of the assembled vehicle. For the example, the vehicle sensors 215 can monitor parts of the vehicle while the vehicle is operating. For example, the vehicle sensors 215 can monitor wheel parts, engine parts, oil filters, and the like. The vehicles sensors 215 can monitor and gather this vehicle part data throughout the lifetime of the vehicle. For example, the vehicle sensors 215 can monitor wear and tear of parts which may be caused by how the part was manufactured, how the part was assembled with the vehicle in the vehicle assembly line, and the like, which can assist in identifying defects or incorrect assembly in the assembly line for any subsequent vehicles that are assembled with that part and/or using that assembly technique. In other words, the vehicle sensors 215 can gather various part and assembly information throughout the lifetime of the vehicle and transmit the vehicle sensor data to the server 120, for example. Accordingly, the system 100 can use the vehicle sensor data to assist in identifying defects and improper assembly based on information from the vehicle sensors 205.

Figure 3:
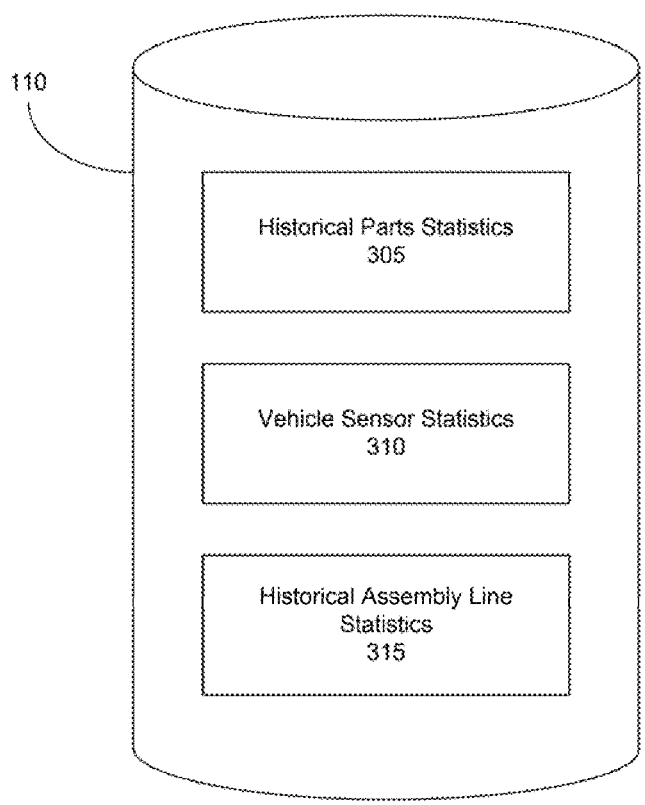
FIG. 3 illustrates a block diagram of a database in the automated manufacturing defect detection system according to one or more aspects of the disclosed subject matter.

FIG. 3 illustrates a block diagram of a database (e.g., database 110) in the automated manufacturing defect detection system 100 according to one or more aspects of the disclosed subject matter. The database 110 can include historical part statistics 305, vehicle sensors statistics 310, and historical assembly line statistics 315. Each of the historical part statistics 305, vehicle sensors statistics 310, and historical assembly line statistics 315 can have been previously calculated at the server 120, for example, using data from the sensors 105 before subsequently being stored in the database 110. The database 110 can also store any data detected by the sensors 105 as the data from the sensors 105 can be used for various calculations, comparisons, analytics, and the like.

Figure 4:
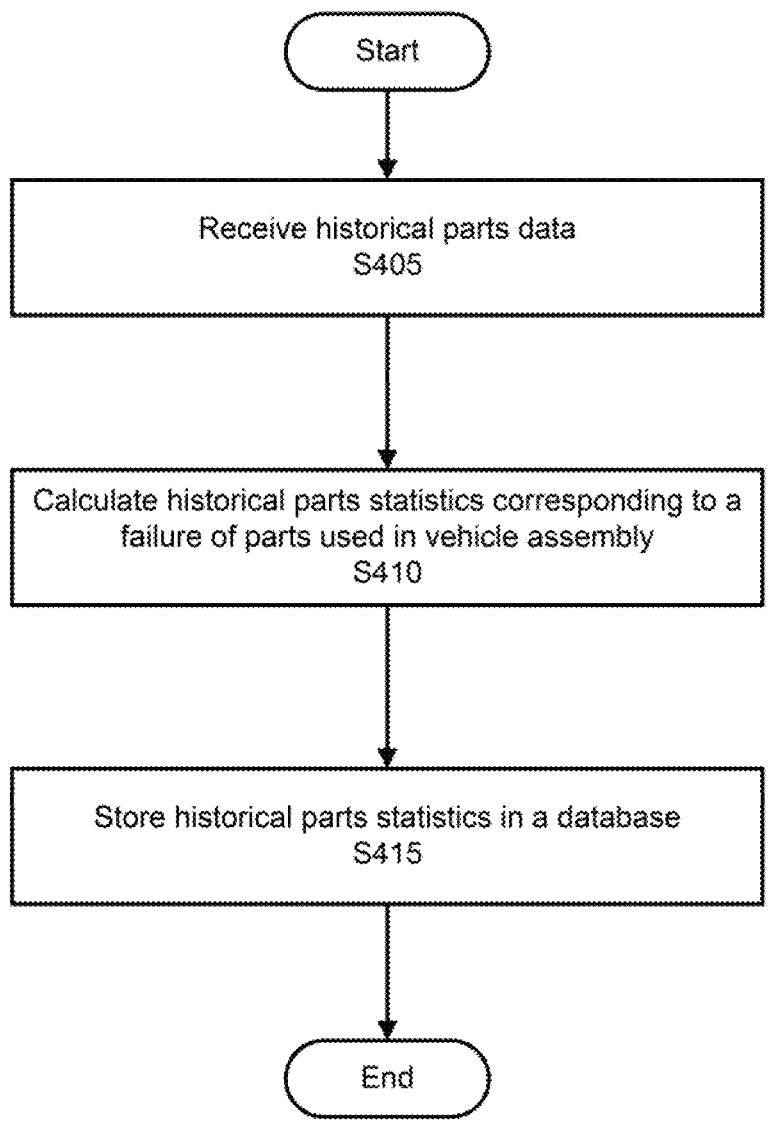
FIG. 4 is an algorithmic flow chart of a method for determining historical parts statistics according to one or more aspects of the disclosed subject matter.

FIG. 4 is an algorithmic flow chart of a method for determining historical parts statistics 305 according to one or more aspects of the disclosed subject matter.

In S405, the system 100 receives historical parts data at the server 120, for example. The historical parts data can be received from parts manufacturers regarding failure of parts. The historical parts data may include information on weak points of the parts, failure points to look out for, warnings from the manufacturer, instructions for proper installation and use, and the like.

In S410, historical parts statistics 305 corresponding to a failure of parts used in vehicle assembly can be calculated based on the historical parts data. The calculation can be performed by the server 120, for example. The historical parts statistics 305 can correspond to the results of data analysis on the historical parts data.

In S415, the historical parts statistics 305 can be stored in a database (e.g., the database 110).

Figure 5:
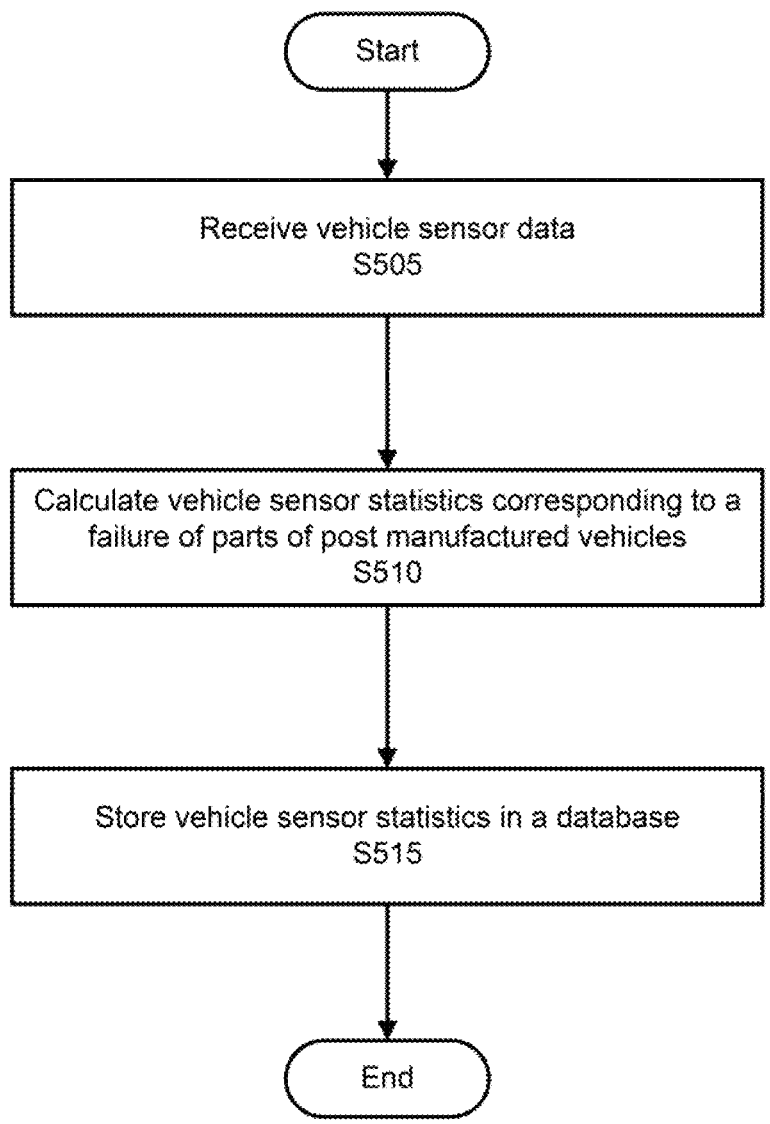
FIG. 5 is an algorithmic flow chart of a method for determining vehicle sensor statistics according to one or more aspects of the disclosed subject matter.

FIG. 5 is an algorithmic flow chart of a method for determining vehicle sensor statistics 310 according to one or more aspects of the disclosed subject matter.

In S505, the system 100 receives vehicle sensor data at the server 120 from the vehicle sensors 215, for example. The vehicle sensor data may include information regarding parts throughout the lifetime of the vehicle. For example, the vehicle sensor data can include information regarding the failure of parts of post manufactured vehicles.

In S510, the server 120 can calculate vehicle sensor statistics 310 corresponding to a failure of parts of post manufactured vehicles based on the vehicle sensor data. For example the vehicle sensor statistics 310 can correspond to the results of data analysis on the vehicle sensor data. Tracking and analyzing the parts throughout the lifetime of the vehicle (e.g., determining why a part failed) can reveal failures that may not have otherwise been discovered. As a result, the opportunity to identify the cause of this failure as early as during the assembly of the vehicle can significantly reduce failure during the lifetime of the vehicle.

In S515, the vehicle sensor statistics 310 can be stored in the database 110.

Figure 6:
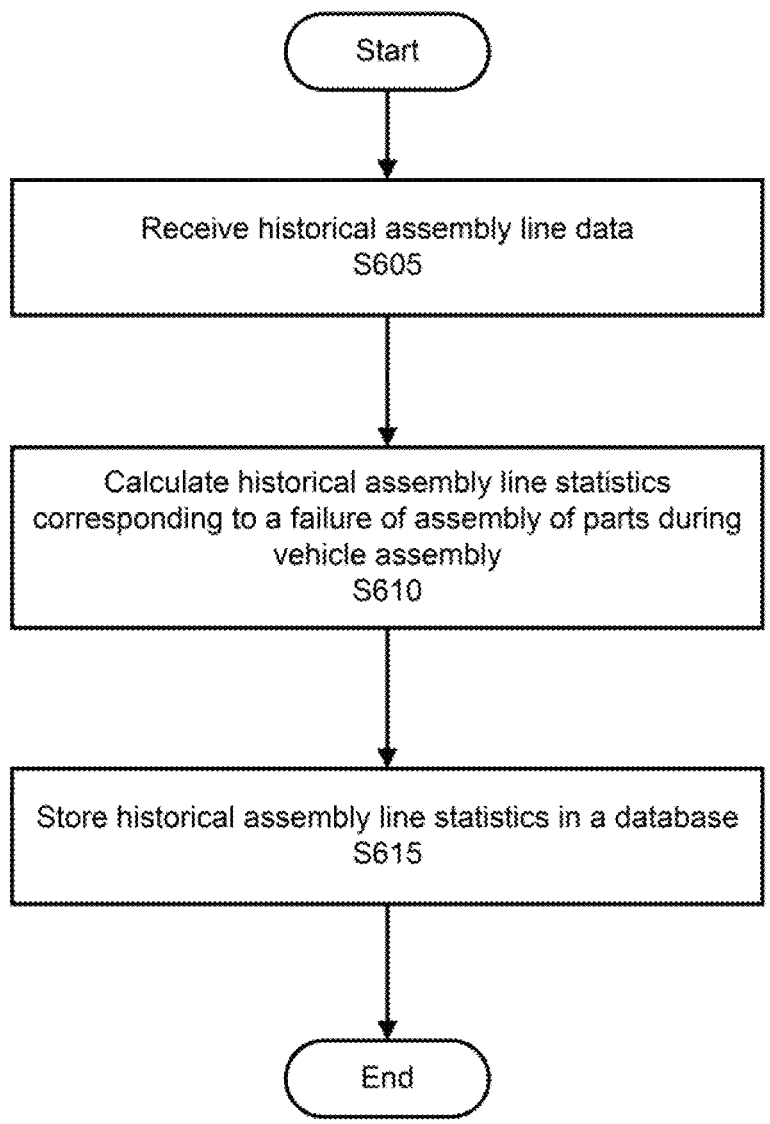
FIG. 6 is an algorithmic flow chart of a method for determining historical assembly line statistics according to one or more aspects of the disclosed subject matter.

FIG. 6 is an algorithmic flow chart of a method for determining historical assembly line statistics 315 according to one or more aspects of the disclosed subject matter.

In S605, the system 100 receives historical assembly line data at the server 120 from the assembly line sensors 210, for example. The historical assembly line data may include information regarding failure of parts and/or improper assembly during the assembly of the vehicle.

In S610, the server 120 can calculate historical assembly line statistics 315 corresponding to a failure of parts and/or improper assembly during vehicle assembly based on the historical assembly line data. For example, historical assembly line statistics 315 can correspond to the results of data analysis of the historical assembly line data. The historical assembly line statistics 315 can assist in identifying failure points of parts during assembly. Additionally, historical assembly line statistics 315 can assist in identifying improper assembly (e.g., when and where to look for improper assembly, what the end result of improper assembly looks like, etc.).

In S615, the historical assembly line statistics 315 can be stored in the database 110.

It should be appreciated that each of the historical parts statistics 305, the vehicle sensor statistics 310, and the historical assembly line data 315 can be continuously updated as new data for each is received. The calculations may be updated in real-time, for example, when any new information from the various sensors (e.g., assembly line sensors 205 and vehicle sensors 215) is received. Additionally, the analysis and corresponding statistics can be organized for specific makes and models of vehicles.

Figure 7:
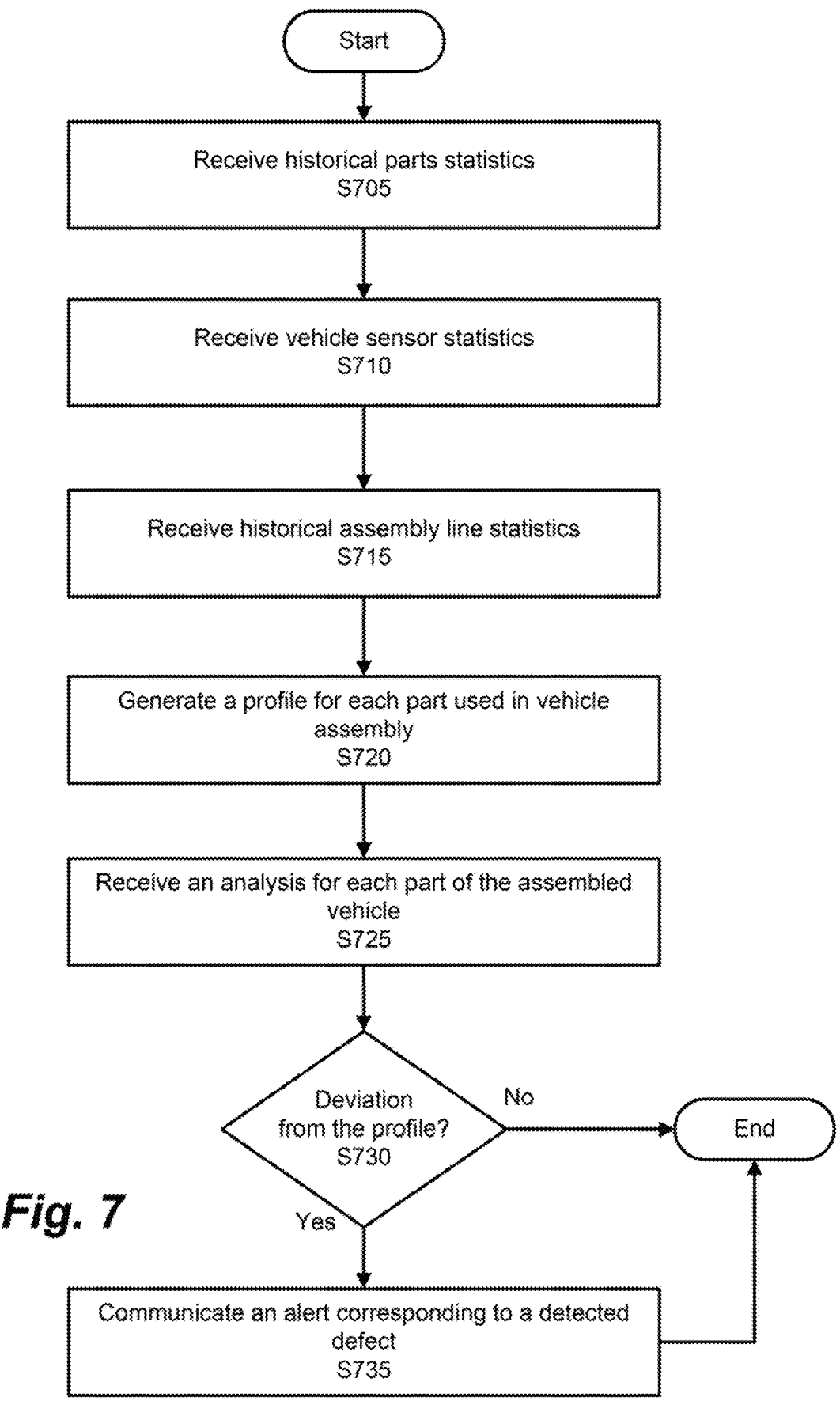
FIG. 7 is an algorithmic flow chart of a method for automated detection of manufacturing defects according to one or more aspects of the disclosed subject matter.

FIG. 7 is an algorithmic flow chart of a method for automated detection of manufacturing defects according to one or more aspects of the disclosed subject matter.

In S705, the server 120 can receive historical parts statistics 305. The historical parts statistics 305 can be received from the database 110 and/or from memory in the server 120 (e.g., the historical parts statistics 305 can be used in real-time after the calculation in S410).

In S710, the server 120 can receive the vehicle sensor statistics 310. The vehicle sensor statistics 310 can be received from the database 110 and/or from memory in the server 120 (e.g., the vehicle sensor statistics 310 can be used in real-time after the calculation in S510).

In S715, the server 120 can receive the assembly line statistics 315. The assembly line statistics 315 can be received from the database 110 and/or from memory in the server 120 (e.g., the assembly line statistics 315 can be used in real-time after the calculation in S610).

In S720, the server 120 can generate a profile for one or more parts used in the vehicle assembly. The profile for each part can define an expected quality threshold. The expected quality threshold can be used to assess whether or not a part looks to be installed correctly, whether the part has any flaws, whether the part is showing any wear, and the like. In other words, the expected quality threshold can correspond to how the part should look and/or operate, and any analysis that reveals that the quality of the part and/or the installation of the part is outside of the quality threshold can correspond to a defect. For example, the distribution statistics for engine revolutions per minute (rpm) can be calculated that constitutes mean, median, inter quartile range, standard deviation, and variance based on historical data. Any new vehicle to be tested can be compared to these statistics, for example, in order to identify a potential defect.

In S725, the server 120 can receive an analysis for each part of the assembled vehicle. For example, the analysis for each part of the assembled vehicle can be performed by the end of assembly line assessment sensors 210, and the end of assembly line assessment sensors 210 can transmit results of the assessment to the server 120.

In S730, it can be determined if there is a deviation from the profile generated in S720. For example, the results from the analysis of each part can be compared to the corresponding profile for that part generated in S720, and if the results of the analysis for the part deviate from the profile generated for that part greater than a predetermined amount, the part may have a defect. To determine whether the part deviates from the profile for that part, it can be determined if the results of the analysis of the part in S725 indicate that the part is not within the quality threshold for that part defined by the profile for that part generated in S720. If it is determined that the part does not deviate from the profile by greater than a predetermined amount (i.e., the part is not outside of the quality threshold defined by the profile generated for that part), then the process can end. However, if it is determined that the part does deviate from the profile by greater than a predetermined amount (i.e., the part is outside of the quality threshold defined by the profile generated for that part), then the system 100 can communicate an alert indicating that a defect is detected in S735.

It should be appreciated that the same process for generating a profile, analysis, and comparison in S720-S730 can also be used to determine an incorrect assembly.

In S735, the system 100 can communicate an alert (e.g., lights, sounds, one or more messages displayed on various displays throughout the system 100, etc.), corresponding to a detected defect in response to the analysis of the part (or assembly) being outside of the quality threshold defined by the profile generated in S720. After the alert is communicated, the process can end.

The system 100 includes various advantages including being able to check each car in an assembly line rather than a random spot check. The system 100 utilizes the technical solution of generating a unique profile for each part of a vehicle and comparing that profile to an assessment of the assembled vehicle to provide an automated defect detection system. This technical solution solves the technical problem of increasing the overall detection of defects, while also increasing the efficiency of the detection of defects. The technical solution uniquely includes data from various sources including vehicle sensors and assembly line sensors and performs the inspection at the assembly line.

For example, the system 100 can utilize big data (e.g., analyzing data from a variety of sensors and information from manufacturers) to precisely identify statistics regarding the parts and assembly for the vehicle, which can then be compared to the vehicle to assist in identify any defects. Additionally, the process described herein that is used to identify deviations can continuously be refined and improved as more data is received and the statistics are updated accordingly. In other words the quality threshold defined by the profile generated for each part in S720 can be continuously refined to increase accuracy in identifying defects. As a result of identifying the defect, the cause of the defect can be investigated and the total number of defects can be decreased, thereby increasing safety for drivers and increasing efficiency for manufacturers.

In the above description of FIGS. 4-7, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 8:
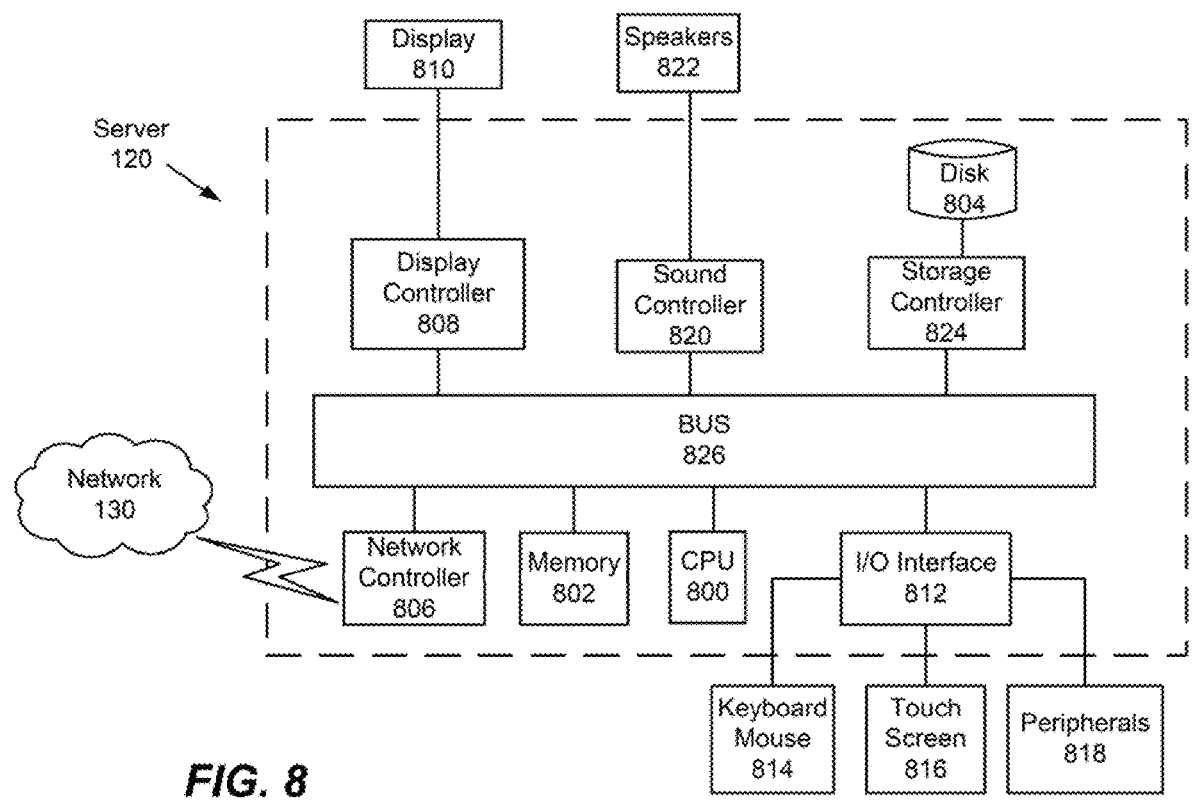
FIG. 8 is a hardware block diagram of a server according to one or more exemplary aspects of the disclosed subject matter.

Next, a hardware description of a server (e.g., the server 120 and/or remote device 115) according to exemplary embodiments is described with reference to FIG. 8. The hardware description described herein can also be a hardware description of the processing circuitry. In FIG. 8, the server 120 includes a CPU 800 which performs one or more of the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 120 communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the server 120 may be realized by various circuitry elements. Further, each of the functions of the above described embodiments may be implemented by circuitry, which includes one or more processing circuits. A processing circuit includes a particularly programmed processor, for example, processor (CPU) 800, as shown in FIG. 8. A processing circuit also includes devices such as an application specific integrated circuit (ASIC) and conventional circuit components arranged to perform the recited functions.

In FIG. 8, the server 120 includes a CPU 800 which performs the processes described above. The server 120 may be a general-purpose computer or a particular, special-purpose machine. In one embodiment, the server 120 becomes a particular, special-purpose machine when the processor 800 is programmed to perform automated manufacturing defect detection (and in particular, any of the processes discussed with reference to FIGS. 4-7).

Alternatively, or additionally, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The server 120 in FIG. 8 also includes a network controller 806, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks.

The network 130 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 120 further includes a display controller 808, such as a graphics card or graphics adaptor for interfacing with display 810, such as a monitor. A general purpose I/O interface 812 interfaces with a keyboard and/or mouse 814 as well as a touch screen panel 816 on or separate from display 810. General purpose I/O interface also connects to a variety of peripherals 818 including printers and scanners.

A sound controller 820 is also provided in the server 120 to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the server 120. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An automated manufacturing defect detection system, comprising:
    processing circuitry configured to
        receive historical parts data and calculate historical parts statistics corresponding to a failure of parts used in a vehicle assembly,
        receive vehicle sensor data and calculate vehicle sensor statistics corresponding to a failure of parts of post manufactured vehicles,
        receive historical assembly line data and calculate historical assembly line statistics corresponding to a failure of assembly of parts during the vehicle assembly,
        generate a profile based on the historical parts statistics, vehicle sensor statistics, and historical assembly line statistics for one or more parts used in the vehicle assembly,
        receive an analysis of each of the one or more parts of the assembled vehicle,
        determine whether any of the one or more analyzed parts deviate from the profile generated for that part, and
        in response to a determination that any of the one or more analyzed parts deviate from the profile generated for that part by greater than an expected quality threshold, automatically communicate an alert corresponding to the deviation, wherein the deviation being greater than the expected quality threshold corresponds to a manufacturing defect and improper assembly.

2. The system of claim 1, wherein the profile generated for each of the one or more parts defines the expected quality threshold for the respective part.

3. A method for automated detection of manufacturing defects, comprising:
    receiving, via processing circuitry, historical parts data and calculating historical parts statistics corresponding to a failure of parts used in a vehicle assembly;
    receiving, via the processing circuitry, vehicle sensor data and calculate vehicle sensor statistics corresponding to a failure of parts of post manufactured vehicles;
    receiving, via the processing circuitry, historical assembly line data and calculate historical assembly line statistics corresponding to a failure of assembly of parts during the vehicle assembly;
    generating, via the processing circuitry, a profile based on the historical parts statistics, vehicle sensor statistics, and historical assembly line statistics for one or more parts used in the vehicle assembly;
    receiving, via the processing circuitry, an analysis of each of the one or more parts of the assembled vehicle;
    determining, via the processing circuitry, whether any of the one or more analyzed parts deviate from the profile generated for that part; and
    in response to a determination that any of the one or more analyzed parts deviate from the profile generated for that part by greater than an expected quality threshold, automatically communicating, via the processing circuitry, an alert corresponding to the deviation, wherein the deviation being greater than the expected quality threshold corresponds to a manufacturing defect and improper assembly.

4. The method of claim 3, wherein the profile generated for each of the one or more parts defines the expected quality threshold for the respective part.

5. A non-transitory computer-readable storage medium storing computer-readable instructions thereon which, when executed by a computer, cause the computer to perform a method, the method comprising:
    receiving historical parts data and calculate historical parts statistics corresponding to a failure of parts used in a vehicle assembly;
    receiving vehicle sensor data and calculate vehicle sensor statistics corresponding to a failure of parts of post manufactured vehicles;
    receiving historical assembly line data and calculate historical assembly line statistics corresponding to a failure of assembly of parts during the vehicle assembly;
    generating a profile based on the historical parts statistics, vehicle sensor statistics, and historical assembly line statistics for one or more parts used in the vehicle assembly;
    receiving an analysis of each of the one or more parts of the assembled vehicle;
    determining whether any of the one or more analyzed parts deviate from the profile generated for that part; and
    in response to a determination that any of the one or more analyzed parts deviate from the profile generated for that part by greater than an expected quality threshold, automatically communicating an alert corresponding to the deviation, wherein the deviation being greater than the expected quality threshold corresponds to a manufacturing defect and improper assembly.

6. The non-transitory computer-readable storage medium of claim 5, wherein the profile generated for each of the one or more parts defines the expected quality threshold for the respective part.

* * * * *